(12) United States Patent
Diken et al.

(10) Patent No.: US 12,159,439 B2
(45) Date of Patent: Dec. 3, 2024

(54) LED ARRAY OPTIMIZATION USING ARTIFICIAL NEURAL NETWORKS

(71) Applicant: Lumileds LLC, San Jose, CA (US)

(72) Inventors: Erkan Diken, Eindhoven (NL); Arjen Gerben Van der Sijde, Eindhoven (NL); Nicola Bettina Pfeffer, Eindhoven (NL)

(73) Assignee: Lumileds LLC, San Jose, CA (US)

( * ) Notice: Subject to any disclaimer, the term of this patent is extended or adjusted under 35 U.S.C. 154(b) by 66 days.

(21) Appl. No.: 18/070,786

(22) Filed: Nov. 29, 2022

(65) Prior Publication Data

US 2023/0177793 A1 Jun. 8, 2023

Related U.S. Application Data

(60) Provisional application No. 63/285,171, filed on Dec. 2, 2021.

(51) Int. Cl.
| | |
|---|---|
| *G06V 10/141* | (2022.01) |
| *G06T 7/00* | (2017.01) |
| *G06V 10/56* | (2022.01) |

(52) U.S. Cl.
CPC .......... *G06V 10/141* (2022.01); *G06T 7/0002* (2013.01); *G06V 10/56* (2022.01);
(Continued)

(58) Field of Classification Search
CPC .... G06V 10/141; G06V 10/56; G06V 10/774; G06V 10/776; G06V 10/778;
(Continued)

(56) References Cited

U.S. PATENT DOCUMENTS

| | | | |
|---|---|---|---|
| 2005/0046739 A1* | 3/2005 | Voss | H04N 23/74 348/E5.079 |
| 2015/0331107 A1* | 11/2015 | Galera | H04N 23/741 382/165 |

(Continued)

FOREIGN PATENT DOCUMENTS

| | | |
|---|---|---|
| CN | 112070659 | 12/2020 |
| CN | 111193820 | 8/2021 |

(Continued)

OTHER PUBLICATIONS

"International Application Serial No. PCT/US2022/051184, International Search Report mailed Mar. 30, 2023", 4 pgs.

(Continued)

*Primary Examiner* — Padma Haliyur
(74) *Attorney, Agent, or Firm* — Schwegman, Lundberg & Woessner, P.A.

(57) ABSTRACT

An illumination arrangement in a mobile device is provided that uses an artificial neural network (ANN) to correct an image of a scene. The mobile device has an illumination apparatus with an LED array that emits light to illuminate a scene. The LED array has LEDs, separated by borders, that are independently driven. A camera has a sensor to capture an image of the scene. The ANN has a training mode in which the ANN is trained using a set of images captured by the camera to generate parameters. The ANN is trained offline in a cloud network. A processor uses the trained ANN in an inference mode to correct the image.

20 Claims, 6 Drawing Sheets

(52) U.S. Cl.
CPC .............. *G06T 2207/10024* (2013.01); *G06T 2207/20081* (2013.01); *G06T 2207/20084* (2013.01)

(58) Field of Classification Search
CPC ...... G06V 10/98; G06V 10/82; G06T 7/0002; G06T 2207/10024; G06T 2207/20081; G06T 2207/20084; H04N 23/617; H04N 23/56; H04N 23/74; H05B 45/10
See application file for complete search history.

(56) References Cited

U.S. PATENT DOCUMENTS

| 2017/0249501 | A1* | 8/2017 | Van der Sijde | G03B 15/05 |
|---|---|---|---|---|
| 2019/0159316 | A1* | 5/2019 | Pfeffer | H05B 47/11 |
| 2019/0213748 | A1* | 7/2019 | Kato | H04N 23/56 |
| 2021/0080155 | A1 | 3/2021 | Linares | |
| 2021/0227120 | A1* | 7/2021 | Otten | H04N 23/74 |
| 2022/0070982 | A1* | 3/2022 | Hussell | H05B 45/12 |
| 2022/0292635 | A1* | 9/2022 | Kang | H04N 9/73 |
| 2022/0295030 | A1* | 9/2022 | Hernandez | G06V 10/774 |
| 2023/0088801 | A1* | 3/2023 | Lawrence | G06T 5/50 |
| | | | | 348/164 |

FOREIGN PATENT DOCUMENTS

| KR | 20160104886 | | 9/2016 | | |
|---|---|---|---|---|---|
| KR | 20210077600 | | 6/2021 | | |
| WO | WO-2021093947 | A1 * | 5/2021 | ............. | G06V 10/56 |
| WO | WO-2022099227 | A1 * | 5/2022 | ............. | G06N 3/045 |

OTHER PUBLICATIONS

"International Application Serial No. PCT/US2022/051184, Written Opinion mailed Mar. 30, 2023", 4 pgs.

* cited by examiner

LED ARRAY OPTIMIZATION USING ARTIFICIAL NEURAL NETWORKS

PRIORITY CLAIM

This application claims the benefit of priority to U.S. Provisional Patent Application Ser. No. 63/285,171, filed Dec. 2, 2021, which is incorporated herein by reference in its entirety.

FIELD OF THE DISCLOSURE

The present disclosure relates to an adjustable light-emitting diode (LED) array.

BACKGROUND OF THE DISCLOSURE

There is ongoing effort to improve illumination systems of various types. In particular, it is desired to enable automatic adjustment in a lighting arrangement to meet image quality metrics.

BRIEF DESCRIPTION OF THE DRAWINGS

Corresponding reference characters indicate corresponding parts throughout the several views. Elements in the drawings are not necessarily drawn to scale. The configurations shown in the drawings are merely examples and should not be construed as limiting in any manner.

DETAILED DESCRIPTION

With the advent of more advanced electronics and increasingly demanding image quality metrics, lighting arrangements having advanced functionality are desired. One such issue is over and under exposure problems introduced with conventional LED flash due, for example, to changing ambient lighting conditions across an image. To combat this, an adaptive light source may be introduced that contains multiple segments in which each segment can be controlled individually and may have its own settings (e.g., current, pulse width modulation (PWM)) to illuminate a scene. If used as a camera flash, the illumination pattern emitted by the light source can be adapted to the scene. For example, the adaptive light source may provide different amounts of light to different portions of the scene dependent on an amount of ambient light received by the portions of the scene and/or dependent on the distances from the portions of the scene to the adaptive light source. In one particular example, the light source may provide more light to parts of the scene that are not well lit (compared to other parts of the scene) by ambient light, and less light to parts of the scene that are well lit by ambient light or are closer to camera (than the other parts of the scene). Thus, for a given scene and ambient light conditions, the light source can be adapted to the scene based on an algorithmic evaluation to improve certain image quality metrics.

It is desirable for a mobile device equipped with a LED module to provide sufficient values for flash photography, including those related to material, electrical, optical, power, and design-related parameters. Thus, in addition to circuitry and design choices, the LED module may use optics (such as lenses) to guide light emitted by the LED light source. Moreover, at the system level, other parameters such as positioning of the LED module with the rest of the components (e.g., other sensors) and form factor of components increase the amount of complexity.

Flash photography with an adaptive LED array introduces more challenges with respect to systems with a conventional LED array. For example, an adaptive LED array may or may not have a uniform structure unlike a conventional LED array. In addition, the optical design for an adaptive LED array is more complex than for a conventional LED array due at least in part to the structural issues.

Figure 1:
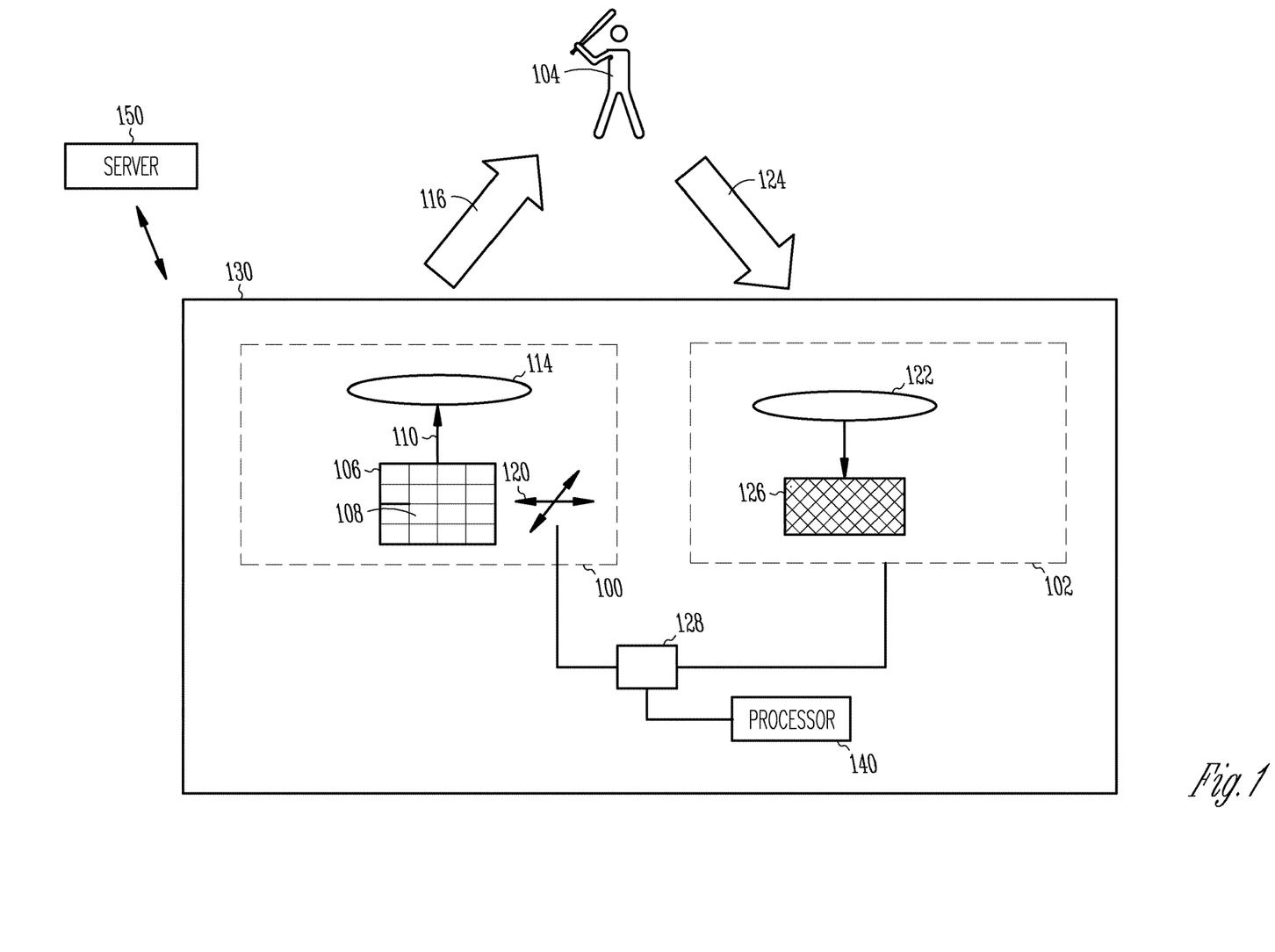
FIG. 1 shows a side view of an illumination arrangement, in accordance with some examples.

FIG. 1 shows a side view of an illumination arrangement, in accordance with some examples. The illumination arrangement 130 may be, for example, a mobile device and may include both an illumination apparatus 100 and a camera 102. The camera 102 can capture an image of a scene 104 during an exposure duration of the camera 102, without the illumination apparatus 100 or with the scene 104 illuminated by the illumination apparatus 100. A processor 140 may be used to control various functions of the illumination arrangement 130. Although only a single processor 140 is shown in FIG. 1, in other embodiments one or more processors may be used to provide the functionality described herein.

The illumination apparatus 100 can include a light-emitting diode (LED) array 106. The LED array 106 can include a plurality of LEDs 108 that can produce light 110 during the exposure duration of the camera 102. The LED array 106 may, in some embodiments, contain segmented LEDs or micro-LEDs.

In embodiments in which the LED array 106 is a micro-LED array, the LED array 106 may include thousands to millions of microscopic LED pixels that can emit light and that can be individually controlled or controlled in groups of pixels (e.g., 5×5 groups of pixels). The microLEDs are small (e.g., <0.01 mm on a side) and may provide monochromatic or multi-chromatic light, typically red, green, and blue using, for example, an inorganic semiconductor material. An LED array 106 that is formed from inorganic material (e.g., binary compounds such as gallium arsenide (GaAs), ternary compounds such as aluminum gallium arsenide (AlGaAs), quaternary compounds such as indium gallium phosphide (InGaAsP), or other suitable materials) is more robust than organic LEDs, allowing use in a wider variety of environments. In addition, An LED array 106 that is formed from microLEDs may permit direct emission and can be more efficient than the conventional combination of backlight and liquid crystal display (LCD).

Figure 2:
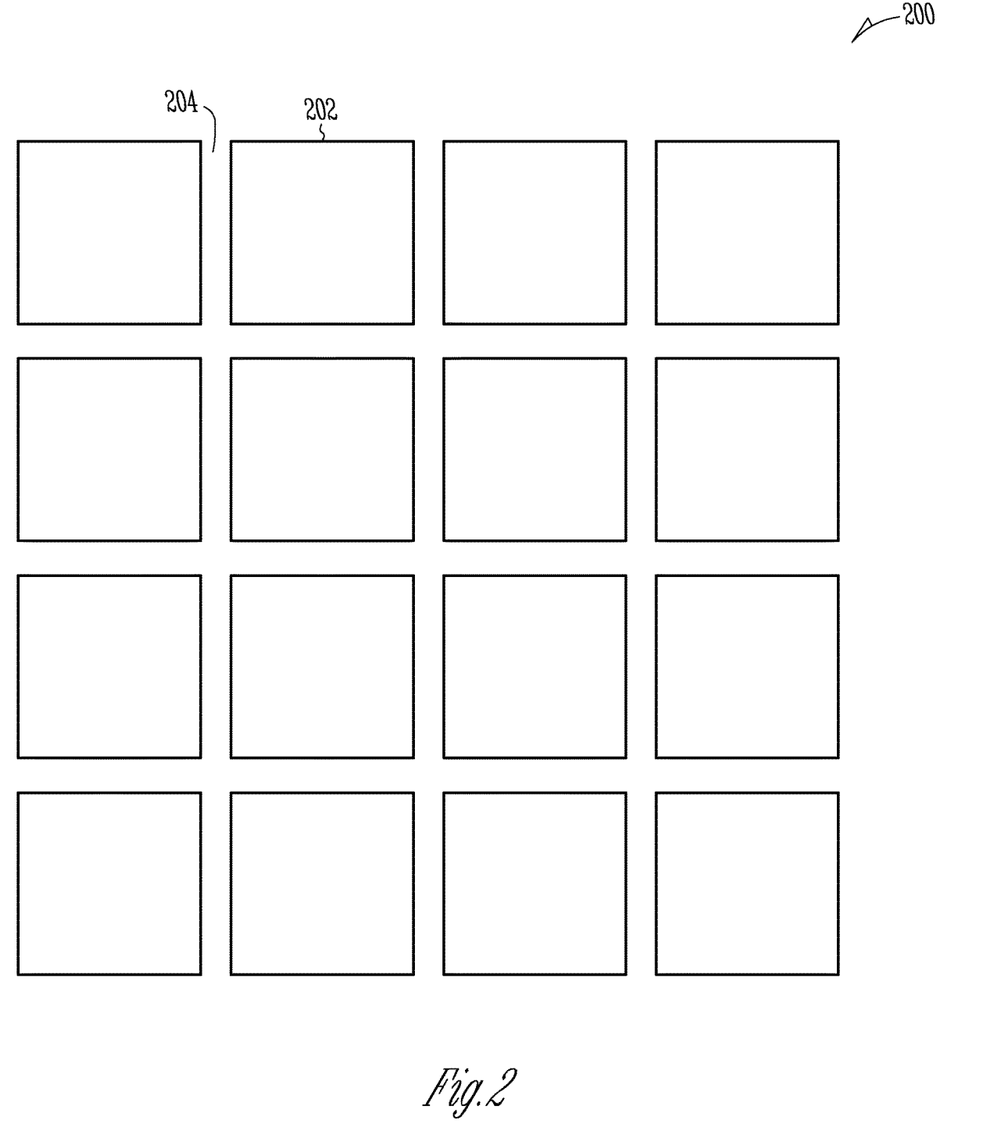
FIG. 2 illustrates a LED array, in accordance with some examples.

In embodiments, in which the LED array 106 contains segmented LEDs, the LED array 106 can include one or more non-emitting areas located between adjacent LEDs 108 in the LED array 106, as shown in FIG. 2. The size of the non-emitting areas located between adjacent LEDs 108 (i.e., the distance between adjacent LEDs 108) may be significant (e.g., about 5% to about 10%) of the size of the LEDs 108 (i.e., the distance between adjacent sides of the LED 108) in the LED array 106. In some examples, one or more of the non-emitting areas can surround the LEDs 108 in the LED array 106, causing dark bands to appear in the illumination emitted by the LED array 106.

The illumination apparatus 100 can include at least one lens 114. The lens 114 can direct the light 110 toward the scene 104 as illumination 116. The illumination apparatus 100 can include one or more actuators 120. In other embodiments, the actuator 120 may not be used. Instead, such a system may have a fixed lens, and thus fixed aperture. In systems that contain the actuator 120, the actuator 120 may include individual translators that respectively translate at least one of the LED array 106 or the lens 114 during the exposure duration of the camera 102 so as to blur the dark bands in the illumination 116 in the image of the scene 104. In some examples, one of the translators can translate the LED array 106 with respect to the lens 114. In some examples, another of the translators can translate the lens 114 with respect to the LED array 106. In some examples, the actuator 120 (a single element) can translate both the lens 114 and the LED array 106. In some examples, the lens 114 can define a longitudinal axis that extends from the LED array 106, through a center of the lens 114, to the scene 104.

In some examples, the actuator 120 or each translator can be a one-dimensional actuator that can translate at least one of the LED array 106 or the lens 114 in an actuation direction that is angled with respect to the longitudinal axis. In some examples, the actuation direction can be generally orthogonal to the longitudinal axis. In some examples, the LED array 106 can be arranged in a two-dimensional pattern having a first array direction and a second array direction that is orthogonal to the first array direction. In some examples, the actuation direction can be angled with respect to the first array direction and angled with respect to the second array direction. In some examples, the LED array 106 can be arranged in a one-dimensional pattern that extends along an array direction. In some examples, the actuation direction can be non-orthogonal to the array direction. In some examples, the actuation direction can be generally parallel to the array direction. In some examples, the actuator 120 can translate at least one of the LED array 106 or the lens 114 in the actuation direction by a distance greater than or equal to a width of a non-emitting area of the one or more non-emitting areas of the LED array 106 during the exposure duration of the camera 102. In some examples, the actuator 120 can oscillate at least one of the LED array 106 or the lens 114 in the actuation direction. In some examples, the oscillation can have an oscillation period that is less than the exposure duration of the camera 102.

In some examples, the actuator 120 or each translator can be a two-dimensional actuator that can translate at least one of the LED array 106 or the lens in an actuation plane that is angled with respect to the longitudinal axis. For example, the actuator 120 can include two movement-producing elements, with one element coupled to the LED array 106 and the other movement-producing element coupled to the lens 114. In some examples, the actuation plane can be generally orthogonal to the longitudinal axis.

In addition, or instead of actuation, multiple LED arrays containing segmented LEDs may be used to illuminate the scene. In this case, the borders between the LEDs that form dark bands in the illumination can be offset between different LED arrays. The offset can help reduce or eliminate dark bands in the total illumination at the scene, which could be present if only one LED array and lens were used.

The camera 102 may sense light at least the wavelength emitted by the LED array 106. The camera 102 can include optics (e.g., at least one camera lens 122) that can collect reflected light 124 that is reflected from and/or emitted by the scene 104. The camera lens 122 can direct the reflected light 124 onto a multi-pixel sensor 126 to form an image of the scene 104 on the multi-pixel sensor 126. A controller 128 can receive a data signal that represents the image of the scene 104. The controller 128 can optionally additionally drive the actuator 120 or each translator. The controller 128 can optionally additionally drive the LEDs 108 in the LED array 106. For example, the controller can optionally control one or more LEDs 108 in the LED array 106 independent of another one or more LEDs 108 in the LED array 106, so as to illuminate the scene in a specified manner. For example, it may be desirable to provide relatively close objects in the scene 104 a first amount of illumination, and relatively distant objects in the scene 104 a second amount of illumination, greater than the first amount, to have a same brightness in the image of the scene 104. Other configurations are also possible. The camera 102 and illumination apparatus 100 can be disposed in a housing (not shown) that contains the illumination arrangement 130.

The illumination apparatus 100 can also include an input device, for example, a user-activated input device such as a button that is depressed to take a picture. The camera 102 and illumination apparatus 100 can be disposed in a housing that contains the illumination arrangement 130. A transmitter may be used to send an image being illuminated to a remote processing device, such as the server 150, located in a different geographic area (e.g., city) than the illumination apparatus, or may be provided in a distributed (cloud) network. The image may be communicated to the external processing device via a local network, such as WiFi, or a remote network such as a $5^{th}$ generation (5G) network or some other network.

FIG. 2 illustrates an LED array in accordance with some examples. The LED array 200 may contain LEDs 202 that are segmented and can form corresponding illumination regions in the illumination 116 at the scene 104 shown in FIG. 1. The borders 204 can form dark bands in the illumination 116 at the scene 104. In some examples, the dark bands in the first illumination 116 at the scene 104 can correspond to borders 204 that extend along a first direction and borders that extend along a second direction that is orthogonal to the first direction. In some examples, the LEDs 202 can be arranged in a rectilinear array along orthogonal first and second dimensions. In some examples, each border 204 can be arranged as an elongated area that extends along one of the first or second dimensions. In some examples, at least one border 204 (corresponding to dark bands) can extend in an unbroken line along a full extent of the first rectilinear array. In some examples, at least one border 204 can include a discontinuity or offset. In some examples, at least one border 204 can include a plurality of segments that are parallel. In other embodiments, in which multiple LED arrays 106 are used, the borders of the LED arrays 106 may not be coincident and/or may differ (e.g., only one may have a discontinuity).

Figure 3:
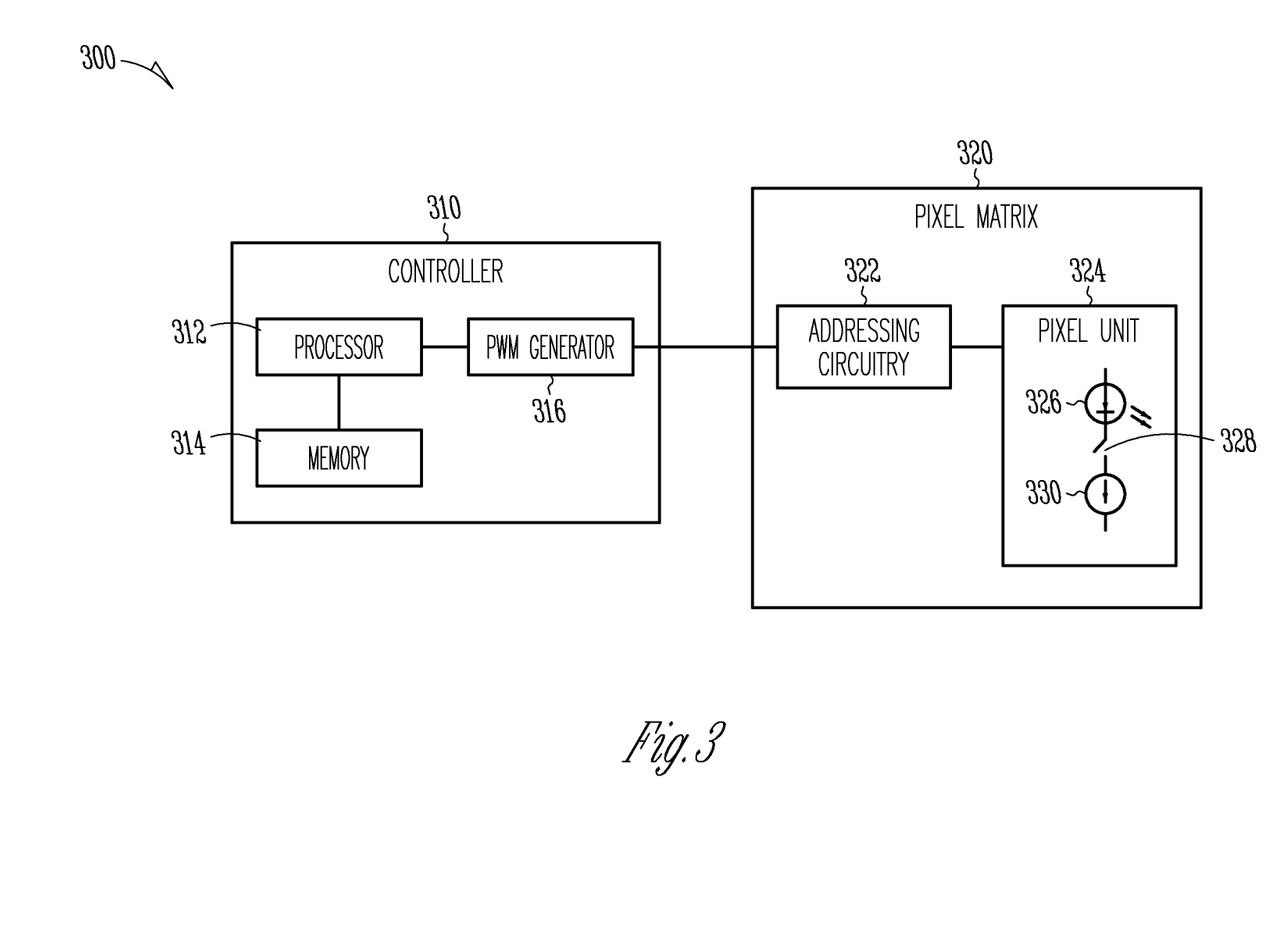
FIG. 3 illustrates an example of a lighting system, in accordance with some examples.

FIG. 3 illustrates an example of a lighting system, according to some embodiments. As above, some of the elements shown in the lighting system 300 may not be present, while other additional elements may be disposed in the lighting system 300. Some or all of the elements may be provided on, for example, a printed circuit board (PCB) or other type of substrate. The lighting system 300 may include, among other items, a controller 310 and a pixel matrix 320. In some embodiments, some or all of the controller 310 components may be disposed on, for example, a compound metal oxide semiconductor (CMOS) backplane or other backplane on which semiconductor materials may be deposited to form (or otherwise dispose) the transistors or related components to control individual pixel units 324 of the pixel matrix 320 (which includes the LED array). The controller 310 may include a processor 312, a memory 314, and a PWM generator 316 (or current generator) among other circuitry.

The controller 310 may be used to, among others, control driving of the pixel units 324 of the pixel matrix 320 using the PWM generator 316 based on image data stored in the memory 314 or received from external sources, e.g., via internal communications using an internal bus or via WiFi, 5G, or another network using a transceiver (not shown). The processor 312 may control the PWM duty cycles and/or intensities of light, as well as addressing of the pixel matrix 320 to cause the pixel matrix 320 to produce illumination.

The pixel matrix 320 includes addressing circuitry 322 in addition to the pixel units 324. Other circuitry, such as amplifiers, comparators, filters, and the like are not shown for convenience. The addressing circuitry 322 may include circuitry to select one or more rows and columns respectively using a row and column select signal, which may be used to select and thus drive one or more of the pixel units 324 to emit light. The pixel units 324 may contain one or more individual pixels. Each pixel unit 324 may include an LED 326 as well as switching circuitry 328 such as a switch controlled by the PWM signal and a current source 330. The pixel units 324 may be individually driven based on the processor 312 to provide uniform illumination or may provide illumination tailored to the scene being illuminated. For example, if the pixel matrix 320 is formed from micro-LEDs, the pixel units 324 may be driven at different offsets due to current limitations. Note that rather than using a PWM generator 316, the lighting system 300 may use a direct current (DC) driver, which can supply a DC voltage or DC current (or a slowly-varying voltage or a slowly-varying current) of a suitable amplitude to produce a desired brightness from a particular LED 326 of the pixel matrix 320.

In addition to the pixel matrix 320, the controller 310 may also control, for example, the camera 102 shown in FIG. 1. In some embodiments, the controller 310 may separately control illumination provided by each LED 326 so that the LEDs 326 are able to provide different intensities, colors, correlated color temperatures, Duv values (Delta u,v that describes the distance of a light color point from the black body curve), values of color-rendering index (CRI), etc. This may aid in the camera 102 capturing a desired image quality.

In some cases, to meet image quality metrics, the scene may be illuminated multiple times. In particular, a first amount of illumination may be used to illuminate relatively close objects in the scene, and a second amount of illumination, greater than the first amount, may be used to illuminate relatively distant objects in the scene to have a same or similar brightness as the relatively close objects in the scene. To determine the distance to the objects, light of different wavelengths may be used (e.g., IR for calibration and white/visible light for image capture using the calibration) and/or other sensors may be present in the illumination arrangement.

The sensors may include, for example, a 3D sensor such as a time of flight (ToF) sensor that is able to measure an amount of time for light emitted by the LED array and reflected from objects in the scene to travel back to the ToF sensor. The time may be used to calculate the distance to various elements in the scene. In some embodiments, the 3D sensor may be a structured light sensor that projects a specially designed pattern of light on the scene.

One or more cameras may be included in the structured light sensor to measure the position of each part of the light pattern reflected from the scene and determine the distance by triangulation. In some embodiments, the 3D sensor may be an auxiliary camera or cameras positioned at at least a minimal distance from each other in the housing sufficient to allow a comparison between the images captured by the auxiliary cameras. By comparing the position of the objects as seen by the auxiliary cameras, distances to objects in the scene can be determined by triangulation.

In some embodiments, the 3D sensor may provide an auto focus signal of the main camera in the device. While scanning the focus position of the camera lens, the illumination arrangement can detect at which positions which parts of the scene are in focus. A 3D profile of the scene may then be built by translating the corresponding lens positions into the distances to the objects that are in focus for these positions. A suitable autofocus signal may be derived, for example by measuring the contrast or by utilizing phase detection sensors within the camera sensor. When phase detection sensors are used, in some embodiments, for optimal functioning of the adaptive flash, the positions of individual phase detection sensors may correspond to areas illuminated by separate segments of the LED array 106.

As above, the distances may be measured using the same illumination as that emitted by the LED array 106 or may use, for example, IR radiation or radiation of other wavelengths. Thus, in some cases, a first image of the scene may be taken using first illumination conditions, such as uniform illumination in which all portions of the scene are illuminated with a known illumination profile. A second image of the scene may be taken subsequently within a short amount of time (e.g., less than a few seconds) using second illumination conditions. An optimum or desired brightness for all parts of the scene may be calculated based on the first and second images to achieve optimal exposure. In one embodiment, the pixel brightness values of the first image may be subtracted from the respective pixel brightness values of the second image, and the differences between the pixel brightness values of the first and second images may be scaled to determine optimal illumination parameters. A final image may then be taken using the optimal illumination parameters.

Moreover, issues other than distance variations of objects from the LED array 106 affecting the illumination may exist to increase the complexity in obtaining the desired image quality metrics. As the light illuminance decreases according to the inverse square law of distance travelled from an incoherent light source (such as an LED) or other light source or transducer producing an electromagnetic signal, the 3D profile of the scene may be used to determine the amount of light to distribute to the various portions of the scene. The algorithm calculating the desired intensity profile may, however, also take into account the illuminance that each of the objects in the scene receives from ambient light, as well as information gathered with the capture of the first image and may adjust the amount of light accordingly. For example, objects that are already well-illuminated, for example because they are lightly colored or have a relatively greater reflectance (than other objects in the image), may receive less light; objects that are not well-illuminated, for example because they are dark or have a relatively smaller reflectance, may receive more light than may be calculated solely based on their distance from the light source, as determined by the 3D profile.

In a number of cases, tuning physical design parameters such as the parameters discussed herein may not be sufficient to meet user desired image quality metrics. Therefore, image processing algorithms such as those indicated above are used to further tune the illumination arrangement to enhance images taken by the camera 102. To this end, an artificial neural network (ANN)-based approach may be used for optimizing or improving the images taken with the segmented LED array structure described above. The use of an ANN approach may be desirable due to the complexity of the calculations when multiple images are used to determine multiple variables for final image settings.

In particular, at least two parameters, including color variations and illumination patterns of an image, may be examined to meet a desired set of image quality metrics. The color variation may be within a particular segment as well as between segments of the LED array 106. Color variation can be caused by LED driving factors associated with the LED segments, such as manufacturing variability. The driving factors can include the current and PWM settings (e.g., frequency, duty cycle) and temperature of the LED array 106. The illumination patterns are related to the design of a segmented LED array 106. The illumination pattern can be visible on the scene due to the borders 204 (see FIG. 2) between the segments, which can reduce the image quality.

In some embodiments, artificial intelligence (AI)/machine learning (ML) may be used to generate the conditions for providing the illumination. The AI/ML process may include both a training mode to train the AI/ML model (using a predetermined set of images of typical household and/or outdoor objects, for example) and an inference mode to use once the AI/ML model is sufficiently trained. In some embodiments, the AI/ML model may be an ANN. In some embodiments, the external processing device described in relation to FIG. 1 may use object recognition via the AI/ML model to suggest or remotely set the optimal illumination for the object(s). The AI/ML model and storage may be disposed, for example, locally in the illumination arrangement 130 and/or in the server 150.

Figure 4:
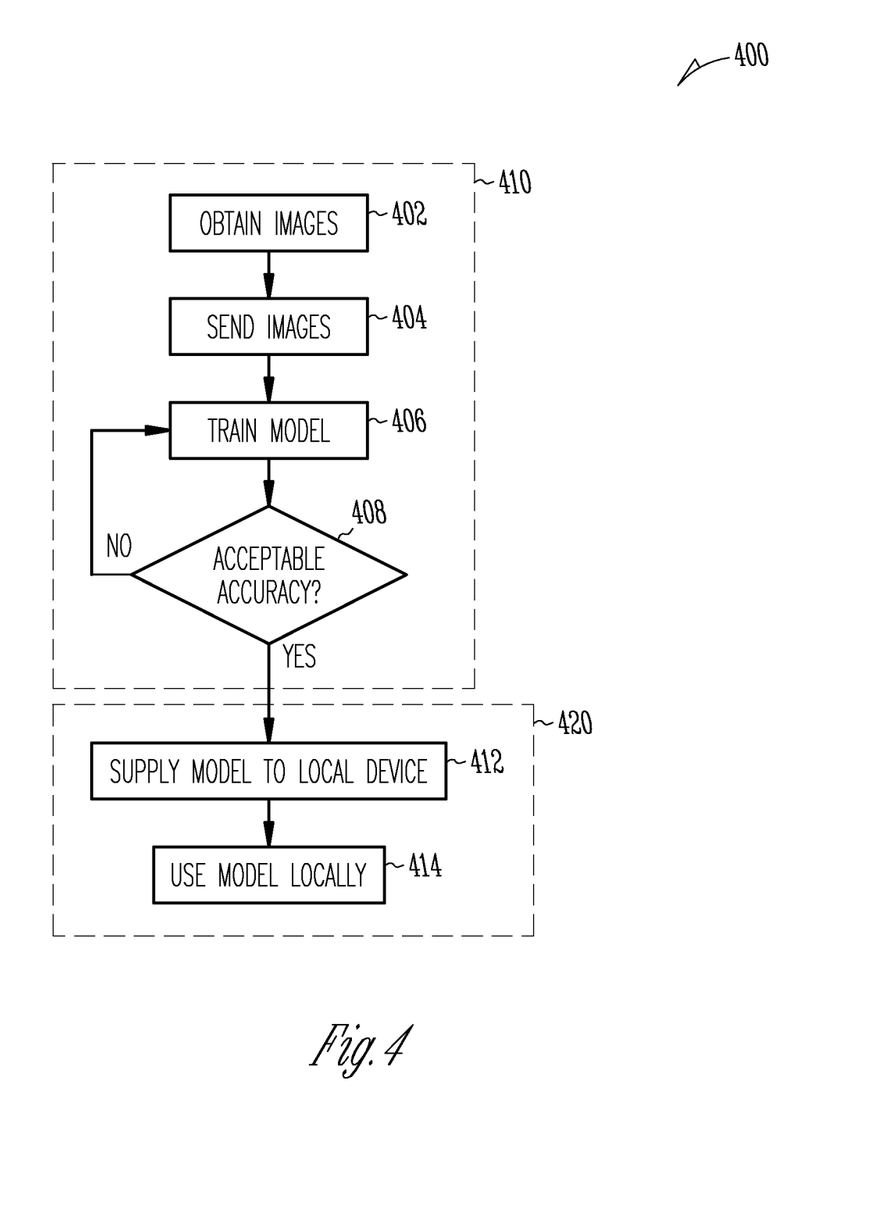
FIG. 4 illustrates an example of a block diagram of an image enhancement process in accordance with some embodiments.

FIG. 4 illustrates an example of a block diagram of an image enhancement process in accordance with some embodiments. Training can be performed on one or more local computing resources. The local computing resources may be provided in, for example, a central processing unit (CPU) and/or graphics processing unit (GPU) (processor 140) within the illumination arrangement 130. Alternatively, or in addition, training may occur using remote computing resources of a remote processing device, which may be the server 150 or in a distributed (cloud) network. For example, in some cases, initial training may be performed remotely using a variety of images under different lighting conditions, and the initial ANN parameters transferred to local computing resources within the illumination arrangement 130 for updating when new images are obtained by the illumination arrangement 130 in the inference mode.

The exemplary method 400 of FIG. 4 includes both initial remote training 410 of the model (offline training) and local use and online training 420 of the initial remotely trained model. The initial remote training is used to obtain an accuracy of the model that is acceptable, and subsequently locally used and further trained when the initial accuracy is satisfactory. The accuracy may be between about 0% to about 100%, depending on the criticality of the application. For instance, the accuracy desired for a life-critical application may be close to 100%, whereas an accuracy above 90% may be acceptable for other applications.

As shown in the initial remote training 410 of the method 400 of FIG. 4, at operation 402, one or more images may be obtained. The image of a scene may be captured by the camera 102 of FIG. 1. Alternatively, one or more predetermined images whose characteristics are known may be obtained from a memory associated with the computing resources or from another device. As a large number of images may be used for training, there may be different ways to collect the images. An image set may include an input image set and an output image set, with each input image having a corresponding output image (the output image being the desired result). The input image may be collected by taking images with one or more image devices (e.g., the camera and segmented LED above), and manual corrections of the input image may be used to generate a corresponding output image. Alternatively, a simulation environment may be used to artificially generate photorealistic images.

When the image(s) captured from the camera 102 is to be used for initial training, at operation 404, a transceiver in the illumination arrangement 130 may send the image of the scene under illumination to a remote processing device. The image(s) may be communicated to the remote processing device via, for example, a local network, such as WiFi, or a 5th generation (5G) network, or another network. The remote processing device may use image recognition to identify one or more objects in the transmitted image(s) and determine the illumination conditions for the objects.

After the image is transmitted at operation 404, the ANN may enter training mode and train the ANN at operation 406. In some cases, the training mode may be initiated when the image(s) are obtained (e.g., captured by the camera 102 and transmitted over the network to the remote processing device). In some embodiments, the training mode may be operated at predetermined intervals in which images of the scene (or predetermined objects) are batched and run when processing resources become available.

In general, the model training corresponds to design space exploration of a model that minimizes the error between given input data and an expected output. Accordingly, training can take varying durations dependent, for example, on the volume of the input data, the complexity of the ANN, and the available computing power. Thus, when input data is supplied to the ANN, the output generated is supplied to the ANN as training feedback.

Figure 5A:
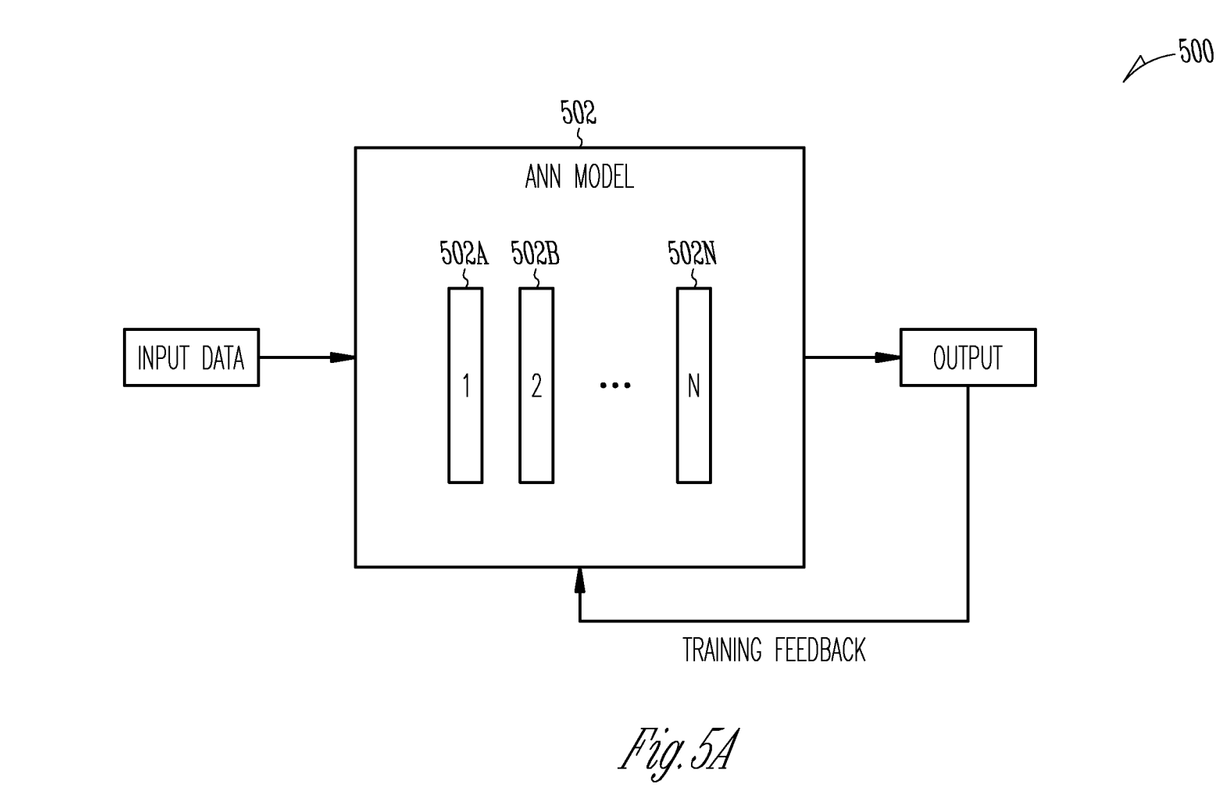
FIG. 5A illustrates an example of a training process in accordance with some embodiments.

FIG. 5A illustrates a training process in accordance with some embodiments. The ANN 502 is a neural network in which multiple layers exist: the first (input) layer 502a, intermediate (hidden) layers 502b . . . 502n-1, and the last (output) layer 502n. Each of the layers 502a . . . 502n in the ANN 502 contains nodes (neurons) that processes the data in the ANN 502 through a sum and transfer function. The prediction accuracy of the ANN 502 depends on the number of nodes in the hidden layers. As shown, the ANN 502 receives input data, which is processed through the layers 502a . . . 502n, before an output is generated and fed back as training feedback to the ANN 502 for further changes to the parameters of the ANN 502. The training process 500 may thus be considered an offline process.

In some embodiments, training may be based on a comparison between the captured image to each of a number of simulated environments in which an image is created without any correction. Each simulated environment may be under a predetermined set of parameters under which the illumination arrangement 130 operates. In particular, the parameters may be based on multiple different aspects of the illumination arrangement 130, including parameters used to drive the illumination apparatus 100 and the camera 102, as well as environmental parameters. In particular, the environments may be based on, among others, driving current/PWM specifics (duty cycle, frequency) used to drive each segment of the LED array 106, optics specifics (e.g., distance from the lens 114/the camera lens 122 from the LED array 106 and position relative to the LED array 106/from the multi-pixel sensor 126), sensor specifics (e.g., exposure time, dynamic range of exposure, gain factor of the multi-pixel sensor 126), noise reduction, and ambient light/flicker in the environment based on information one or more separate sensors. In some cases, multiple images may be generated not only with and without using the LED array 106, but in addition using a conventional LED array to illuminate the scene during or prior to training. These images may be used to generate the parameters.

Turning back to the initial remote training 410 of the method 400 of FIG. 4, at operation 408 the ANN may determine whether the accuracy of the model is acceptable, with acceptability at least based on the above desired accuracy. Depending on the model, what is being trained, and the desired accuracy, a relatively large amount of data (images), time, and/or processing power may be used. In other embodiments, however, relatively less data, time, and the processing power may be used to obtain an acceptable result. As shown in FIG. 4, if the accuracy is determined to be unacceptable, the model returns to operation 406 where the ANN continues to be trained until acceptable accuracy of the model is achieved based on pre-determined factors discussed above.

After the ANN is trained (and the accuracy is determined to be acceptable), local use and training 420 of the initial remotely trained model may begin. Thus, at operation 412 the model may be supplied to the local processing device. That is, the parameters trained for the ANN may be supplied to the memory in the illumination arrangement 130 via the transceiver.

At operation 414, the local processing resources may use the trained ANN as an inference engine and may continue to train the ANN to further improve the accuracy using new incoming data/images (online training). That is, the local processing resources may use the trained ANN to correct the captured image for issues caused by the illumination apparatus 100 and/or image processing, such as the color variations and illumination patterns, among others. Thus, the lighting provided by the illumination apparatus 100, the optical arrangement, and others may be adjusted using the parameters supplied to the ANN in the local processing resources when in the inference mode. In the inference mode, the result of the ANN is monitored, and the output data fed back into performance analysis of the ANN. As a result of performance analysis, the input data set and ANN are updated.

In particular, if image correction alone is unable to provide the desired response, one or more of the physical parameters of the illumination arrangement 130 may be adjusted by a predetermined amount and a new image captured by the camera 102. The new image may then be supplied to the ANN to determine whether the image is enhanced by the adjustment.

Typical machine learning techniques use thousands or millions of images to accurately train a model. In some cases, all the images captured by the camera 102 may be used to train the AI/ML model, while in other embodiments, only a subset of the images may be selected from a larger set of available images. That is, in some embodiments, images may be selected for particular qualities or when substantial differences occur in the scenes captured. For example, the selected images may be determined to be in good focus across the entire image or specific to a particular scene. Images, or portions of images, may be excluded from the training in accordance with the limitations set by the training algorithm. The selected images may be of any subject matter or type when the above conditions are met. For specific applications, images from similar scene content may be sourced, but others may be used. The images may be of any size and the algorithm may automatically adjust to differing image sizes.

Moreover, in some cases, the level of accuracy for the parameters determined during training may depend on the amount of processing resources available, which includes both computing power and available time. That is, the training may result in the same level of accuracy using less computing power and a larger amount of time as more computing power and a smaller amount of time, thereby permitting selection of the appropriate processing resources. For example, initial training may be performed in the cloud to a relatively high level of accuracy and the training parameters provided to the illumination arrangement 130. If further training is used within the illumination arrangement 130, the accuracy level of the parameters may be reduced due to the reduced computing resources for training of a generic ANN within the illumination arrangement 130. In some embodiments, the training or inference to provide the corrections may be performed on a dedicated chip within the illumination arrangement 130 or may be provided on a main central processing unit. Selection of the processing resources for training may depend on the permitted amount of time to train as calls to the main central processing unit may result in longer time being used than when a dedicated chip is used.

In some embodiments, the ANN may be a general model that is initially generalized to real world conditions. An ANN may be used as the illumination provided by the illumination arrangement 130 may be unable to tune the LEDs 108 to every scene to correct to a level that is acceptable by a particular user. The user may also provide further feedback during training of the ANN on the illumination arrangement 130 to provide user-specific optimization, which may be different from user to user.

Figure 5B:
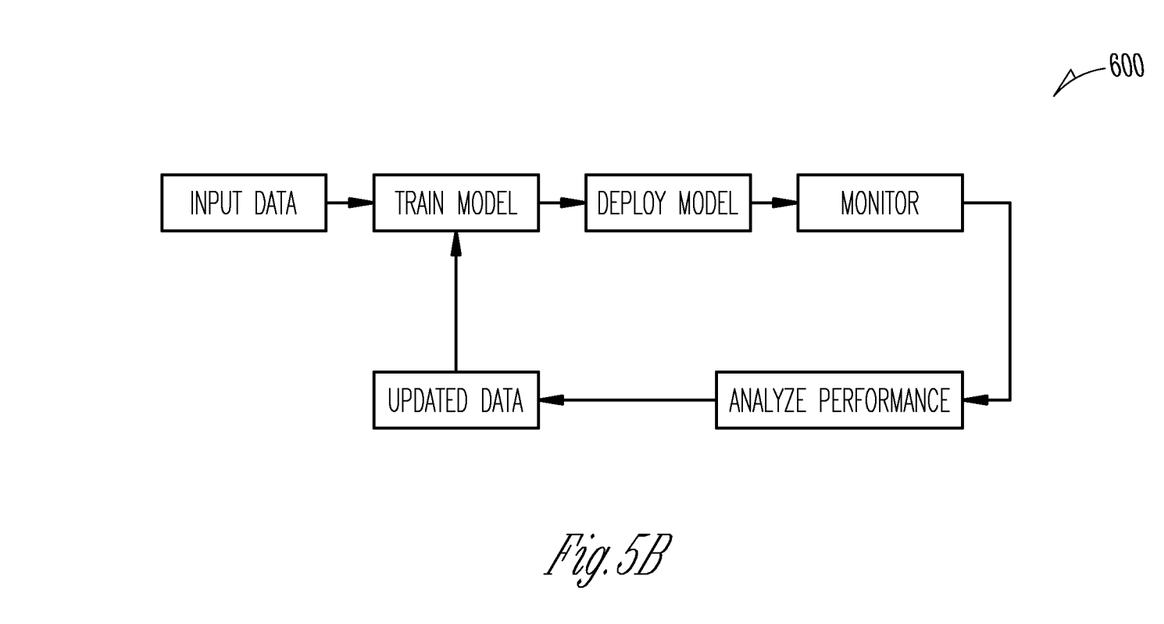
FIG. 5B illustrates an example of an inference process in accordance with some embodiments.

FIG. 5B illustrates an inference process 600 in accordance with some embodiments. In the inference process 600, input data is fed to the ANN which is trained and then deployed. The output of the ANN is monitored, and the performance of the ANN is analyzed to update the data used to train the ANN. The updated data is then used to adjust the ANN. The inference process 600 may be considered an online process as it occurs on the illumination arrangement.

In addition to being used in mobile devices, such as smartphones, laptop computers, or computer tablets, among others, the system and method described herein may be applicable in other electronic devices that use an adaptive flash. In some embodiments, the training and inference mode of the ANN may be performed within the mobile (or other) device, with the training being performed prior to the device being initially supplied to a customer (i.e., during testing after fabrication but before being shipped for commercial/personal use).

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The memory may include a non-transitory machine readable medium on which is stored one or more sets of data structures or instructions (e.g., software) embodying or utilized by any one or more of the techniques or functions described herein. The instructions may also reside, completely or at least partially, within a main memory, within static memory, and/or within a hardware processor during execution thereof by the device. The term "machine readable medium" may include a single medium or multiple media (e.g., a centralized or distributed database, and/or associated caches and servers) configured to store the one or more instructions.

The term "machine readable medium" may include any medium that is capable of storing, encoding, or carrying instructions for execution by the device and that cause the device to perform any one or more of the techniques of the present disclosure (such as training or inference by the ANN), or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions may further be transmitted or received over a communications network using a transmission medium via a network interface device utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi®, IEEE 802.16 family of standards known as WiMax®, IEEE 802.15.4 family of standards, a Long Term Evolution (LTE) family of standards, a Universal Mobile Telecommunications System (UMTS) family of standards, peer-to-peer (P2P) networks, a next generation (NG)/$5^{th}$ generation (5G) standards among others. In an example, the network interface device may include one or more physical jacks (e.g., Ethernet, coaxial, or phone jacks) or one or more antennas to connect to the transmission medium.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical CPU, a single- or multi-core processor, and/or any other device capable of executing or otherwise operating computer-executable instructions, such as program code, software modules, and/or functional processes.

EXAMPLES

Example 1 is an illumination arrangement comprising: an illumination apparatus comprising a light-emitting diode (LED) array configured to emit light to illuminate a scene, the LED array comprising a plurality of LEDs separated by borders, the plurality of LEDs configured to be driven independently to provide the light; a camera having a sensor configured to capture an image of the scene; and a processor configured to correct the image of the scene using an artificial neural network (ANN) having a training mode in which the ANN is trained using a set of images to generate parameters to correct the image of the scene and an inference mode in which the ANN is used on the image captured by the camera using the parameters.

In Example 2, the subject matter of Example 1 includes, wherein the processor is configured to correct the image of the scene using the ANN to correct color variations between the plurality of LEDs, variations within the plurality of LEDs, and illumination patterns caused by the borders.

In Example 3, the subject matter of Examples 1-2 includes a transceiver to communicate with a cloud network.

In Example 4, the subject matter of Example 3 includes, wherein: the transceiver is configured to transmit the set of images to the cloud network, and the ANN is trained offline, in the cloud network, during the training mode to generate the parameters.

In Example 5, the subject matter of Example 4 includes, wherein: the transceiver is configured to receive the parameters from the cloud network, and the ANN is used online, by the processor, during the inference mode to correct the image of the scene.

In Example 6, the subject matter of Examples 1-5 includes, wherein during the inference mode the processor is configured to: monitor results of the ANN, analyze performance of the ANN, the performance of the ANN indicating proximity of the image after correction to a simulated image, and update the parameters based on the performance of the ANN.

In Example 7, the subject matter of Examples 1-6 includes, wherein the ANN is used on a dedicated graphics processing unit (GPU).

In Example 8, the subject matter of Examples 1-7 includes, wherein the processor is configured to train the ANN during the training mode and use the ANN during the inference mode to correct the image of the scene.

In Example 9, the subject matter of Examples 1-8 includes, wherein the ANN is trained during the training mode using a same image under different lighting conditions provided by the illumination apparatus.

In Example 10, the subject matter of Example 9 includes, wherein the ANN is trained during the training mode to take into account ambient lighting of the scene.

In Example 11, the subject matter of Examples 1-10 includes, wherein to correct the image, the processor is configured to adjust at least setting of a group of settings comprising at least one setting selected from a current level setting and a pulse width modulation setting to drive each of the plurality of LEDs, integration time of the sensor, and gain of the sensor.

In Example 12, the subject matter of Examples 1-11 includes, wherein the processor is further configured to control mechanical elements within the illumination arrangement based on the ANN.

In Example 13, the subject matter of Examples 1-12 includes, wherein the borders are non-emitting areas located between adjacent LEDs of the plurality of LEDs that are about 5% to about 10% of a distance between adjacent sides of the adjacent LEDs.

Example 14 is a mobile device comprising: an illumination apparatus comprising light-emitting diode (LED) array configured to emit light to illuminate a scene, the LED array comprising a plurality of LEDs separated by borders, the plurality of LEDs configured to be driven independently to provide the light; a camera having a sensor configured to capture an image of the scene; and a processor configured to correct the image of the scene using an artificial neural network (ANN) having a training mode in which the ANN is trained offline using a set of same images under different lighting conditions to generate parameters to correct the image of the scene and an inference mode in which the ANN is used online on the image captured by the camera using the parameters.

In Example 15, the subject matter of Example 14 includes, wherein the processor is configured to correct the image of the scene using the ANN to correct color variations between the plurality of LEDs, variations within the plurality of LEDs, and illumination patterns caused by the borders.

In Example 16, the subject matter of Examples 14-15 includes, wherein the processor comprises a central processing unit (CPU) and a dedicated graphics processing unit (GPU), selection of the ANN is used on dependent on available timing conditions for processing the image.

In Example 17, the subject matter of Examples 14-16 includes, wherein the ANN is configured to provide correction of facial recognition during the inference mode.

Example 18 is a tangible computer-readable storage medium that stores instructions for execution by one or more processors of an electronic device, the one or more processors to configure the electronic device to, when the instructions are executed, perform one or more operations comprising: emit light to illuminate a scene, the light being emitted from a light-emitting diode (LED) array comprising a plurality of LEDs separated by borders, each of the plurality of LEDs driven independently to provide the light; capture an image of the scene using a sensor; and correct the image of the scene using an artificial neural network (ANN) having a training mode in which the ANN is trained using a set of images captured by the sensor to generate parameters to correct the image of the scene and an inference mode in which the ANN is used on the image captured by the electronic device using the parameters.

In Example 19, the subject matter of Example 18 includes, wherein the instructions, when executed, further configure the one or more processors to perform operations comprising: transmit the set of images to a cloud network, where the ANN is trained during the training mode to generate the parameters, and receive the parameters from the cloud network and use the ANN during the inference mode to correct the image of the scene.

In Example 20, the subject matter of Examples 18-19 includes, wherein the instructions, when executed, further configure the one or more processors to perform operations comprising correct the image of the scene using the ANN to correct color variations between the plurality of LEDs, variations within the plurality of LEDs, and illumination patterns caused by the borders.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

While only certain features of the system and method have been illustrated and described herein, many modifications and changes will occur to those skilled in the art. It is, therefore, to be understood that the appended claims are intended to cover all such modifications and changes. Method operations can be performed substantially simultaneously or in a different order.

What is claimed is:

1. An illumination arrangement comprising:
an illumination apparatus comprising a light-emitting diode (LED) array configured to emit light to illuminate a scene, the LED array comprising a plurality of LEDs separated by borders, the plurality of LEDs configured to be driven independently to provide the light;
a camera having a sensor configured to capture an image of the scene; and
a processor configured to correct the image of the scene using an artificial neural network (ANN) having a training mode in which the ANN is trained using a set of images to generate parameters to correct the image of the scene and an inference mode in which the ANN is used on the image captured by the camera using the parameters, correction of the image including correction of color variations between the LEDs, variations within each of the LEDs caused by manufacturing, and illumination patterns that include dark bands caused by the borders between the LEDs.

2. The illumination arrangement of claim 1, further comprising a transceiver to communicate with a cloud network.

3. The illumination arrangement of claim 2, wherein:
the transceiver is configured to transmit the set of images to the cloud network, and
the ANN is trained offline, in the cloud network, during the training mode to generate the parameters.

4. The illumination arrangement of claim 3, wherein:
the transceiver is configured to receive the parameters from the cloud network, and
the ANN is used online, by the processor, during the inference mode to correct the image of the scene.

5. The illumination arrangement of claim 1, wherein during the inference mode the processor is configured to:
monitor results of the ANN, analyze performance of the ANN, the performance of the ANN indicating proximity of the image after correction to a simulated image, and update the parameters based on the performance of the ANN.

6. The illumination arrangement of claim 1, wherein the ANN is used on a dedicated graphics processing unit (GPU).

7. The illumination arrangement of claim 1, wherein the processor is configured to train the ANN during the training mode and use the ANN during the inference mode to correct the image of the scene.

8. The illumination arrangement of claim 1, wherein the ANN is trained during the training mode using a same image under different lighting conditions provided by the illumination apparatus.

9. The illumination arrangement of claim 8, wherein the ANN is trained during the training mode to take into account ambient lighting of the scene.

10. The illumination arrangement of claim 1, wherein to correct the image, the processor is configured to adjust at least setting of a group of settings comprising at least one setting selected from a current level setting and a pulse width modulation setting to drive each of the plurality of LEDs, integration time of the sensor, and gain of the sensor.

11. The illumination arrangement of claim 1, wherein the processor is further configured to control mechanical elements within the illumination arrangement based on the ANN.

12. The illumination arrangement of claim 1, wherein the borders are non-emitting areas located between adjacent LEDs of the plurality of LEDs that are about 5% to about 10% of a distance between adjacent sides of the adjacent LEDs.

13. A mobile device comprising:

an illumination apparatus comprising light-emitting diode (LED) array configured to emit light to illuminate a scene, the LED array comprising a plurality of LEDs separated by borders, the plurality of LEDs configured to be driven independently to provide the light;

a camera having a sensor configured to capture an image of the scene; and a processor configured to correct the image of the scene using an artificial neural network (ANN) having a training mode in which the ANN is trained offline using a set of same images under different lighting conditions to generate parameters to correct the image of the scene and an inference mode in which the ANN is used online on the image captured by the camera using the parameters, correction of the image including correction of color variations between the LEDs, variations within each of the LEDs caused by manufacturing, and illumination patterns that include dark bands caused by the borders between the LEDs.

14. The mobile device of claim 13, wherein the processor comprises a central processing unit (CPU) and a dedicated graphics processing unit (GPU), selection of the ANN is used on dependent on available timing conditions for processing the image.

15. A tangible computer-readable storage medium that stores instructions for execution by one or more processors of an electronic device, the one or more processors to configure the electronic device to, when the instructions are executed, perform one or more operations comprising:

emit light to illuminate a scene, the light being emitted from a light-emitting diode (LED) array comprising a plurality of LEDs separated by borders, each of the plurality of LEDs driven independently to provide the light;

capture an image of the scene using a sensor; and correct the image of the scene using an artificial neural network (ANN) having a training mode in which the ANN is trained using a set of images captured by the sensor to generate parameters to correct the image of the scene and an inference mode in which the ANN is used on the image captured by the electronic device using the parameters, correction of the image including correction of color variations between the LEDs, variations within each of the LEDs caused by manufacturing, and illumination patterns that include dark bands caused by the borders between the LEDs.

16. The tangible computer-readable storage medium of claim 15, wherein the instructions, when executed, further configure the one or more processors to perform operations comprising:

transmit the set of images to a cloud network, where the ANN is trained during the training mode to generate the parameters, and receive the parameters from the cloud network and use the ANN during the inference mode to correct the image of the scene.

17. The illumination arrangement of claim 1, wherein the illumination apparatus is configured to capture subsequent images based on physical parameters of the illumination apparatus that are adjusted based on the ANN.

18. The illumination arrangement of claim 1, wherein the set of images used in the training mode includes a subset of images captured by the camera and based substantial differences between the subset of images captured.

19. The illumination arrangement of claim 1, wherein the set of images used in the training mode includes a subset of images captured by the camera, each particular image of the subset of images selected based on at least one parameter selected from parameters including a predetermined accuracy of focus across an entirety of the particular image and a predetermined accuracy of focus specific to a particular scene within the particular image.

20. The illumination arrangement of claim 1, wherein the ANN is trained using a combination of local training by the processor and remote training by another processor in a cloud network, an initial accuracy of the ANN provided by the remote training and further training subsequently provided by the local training.

* * * * *